United States Patent [19]
Stallard et al.

[11] Patent Number: 5,555,949
[45] Date of Patent: Sep. 17, 1996

[54] ELECTRICALY OPERABLE WHEELCHAIR HAVING A CONTROLLER RESPONSIVE TO DIFFERENT TYPES OF INPUTS

[75] Inventors: Caskel A. Stallard, Wichita, Kans.; Susan O. Scholl, Bozeman, Mont.

[73] Assignee: Cerebral Palsy Research Foundation of Kansas, Wichita, Kans.

[21] Appl. No.: 281,638

[22] Filed: Jul. 28, 1994

Related U.S. Application Data

[63] Continuation of Ser. No. 837,214, Feb. 18, 1992, abandoned.

[51] Int. Cl.$^6$ .................................................. B62D 11/04
[52] U.S. Cl. ...................... 180/6.5; 180/65.8; 180/907; 364/424.01
[58] Field of Search ........................... 180/6.5, 907, 6.48, 180/65.1, 65.8, 316, 323; 364/424.01, 424.05, 426.01; 318/551, 17, 55, 56

[56] References Cited

U.S. PATENT DOCUMENTS

| | | | |
|---|---|---|---|
| 3,965,402 | 6/1976 | Mogle | 180/907 |
| 4,059,786 | 11/1977 | Jones | 180/907 |
| 4,078,627 | 3/1978 | Brown | 180/907 |
| 4,207,959 | 6/1980 | Youdin | 180/6.5 |
| 4,387,325 | 6/1983 | Klimo | 180/907 |
| 4,913,257 | 4/1990 | Janssen | 180/907 |
| 5,033,000 | 7/1991 | Littlejohn | 180/907 |

*Primary Examiner*—Anne Marie Boehler
*Attorney, Agent, or Firm*—Hovey, Williams, Timmons & Collins

[57] ABSTRACT

An electrically operable wheelchair includes a pair of support wheels coupled with a pair of drive motors, one of a plurality of different types of user-operable input devices, and a controller responsive to input signals from the input devices for controlling the operation of the motors and thereby the movements of the wheelchair. The input devices include, for example, a proportional control joy stick and sets of one, two, three or four switches, and are operable for producing different types of input signals characteristic of the corresponding devices and representative of desired wheelchair movements. The controller is operable to respond to the different types of input signals provided by the devices for producing outputs to the motors for effecting the desired wheelchair movements.

40 Claims, 8 Drawing Sheets

MAIN LOOP

SWITCH INPUT (TYPICAL)

Proportional Control

ACCELERATION

TIMER INTERRUPT

ELECTRICALY OPERABLE WHEELCHAIR HAVING A CONTROLLER RESPONSIVE TO DIFFERENT TYPES OF INPUTS

This application is a continuation of application Ser. No. 07/837,214, filed Feb. 18, 1992, now abandoned.

BACKGROUND OF THE INVENTION

1. Field of the Invention

The present invention relates to the field electrically operable wheelchairs. More particularly, the invention hereof concerns a wheelchair including a pair of support wheels coupled with a pair of drive motors, one of a plurality of different types of user-operable input devices, and a controller responsive to input signals from the input devices for controlling the operation of the motors and thereby the movements of the wheelchair. The controller is operable to respond to the different types of input signals provided by the devices for producing outputs to the motors for effecting the desired wheelchair movements.

2. Description of the Prior Art

The prior art discloses electrically operable wheelchairs which typically include a battery, a pair of motors respectively coupled with the main support wheels, a user-operable input device such as a joy stick or a set of switches, and a controller coupled with the input device and the motors for controlling the operation thereof in order to effect desired wheelchair movements. The input device provides input signals representative of desired wheelchair movements to the controller. Different types of input devices are required to accommodate the needs of the user. While a joy stick provides the greatest degree of control, some users do not have the physical ability to operate a joy stick, and as a result must use a set of switches.

The input signals from each type of device are characteristic of that device. For example, a joy stick provides proportional control analog signals and switches provide on-off digital signals. Because of these differing signal characteristics, the associated controller must be designed to respond to the particular type of input signals. This means that if a different type of input device is installed on a wheelchair, the controller must also be changed which adds substantially to the cost because the controller typically costs more than the input device. Additionally, the need to manufacture different types of controllers requires larger inventories and reduces the length of production runs which factors further increased costs.

SUMMARY OF THE INVENTION

The preferred wheelchair and controller hereof solve the prior art problems discussed above and provide a distinct advance in the state of the art. More particularly, the preferred wheelchair includes a controller responsive to a wide variety of different types of input signals produced by correspondingly different types of input devices.

The preferred wheelchair broadly includes a frame-work having structure for supporting the user and a pair of main support wheels, a pair of electrically operable motors respectively coupled with the support wheels, an input device, and a controller coupled with the motors and the input device for controlling the motors in response to the input signals from the input device. The input device is one of a plurality of different types of user-operable input devices which can be used. The input devices provide to the controller a corresponding plurality of different types of input signals representative of desired wheelchair movements. The controller includes means for responding to these different types of input signals for controlling operation of the motors and thereby the wheelchair movements.

More particularly, the preferred controller includes a set of switches for indicating the type of input device to which the controller should respond. Additionally, the controller also includes a set of potentiometers for setting the movement parameters of the motors. These parameters include maximum speeds for turning, forward and reverse motion, acceleration and braking as well as delay time between input signal receipt and execution.

Other preferred aspects of the present invention are disclosed further hereinbelow.

DETAILED DESCRIPTION OF THE PREFERRED EMBODIMENT

Figure 1:
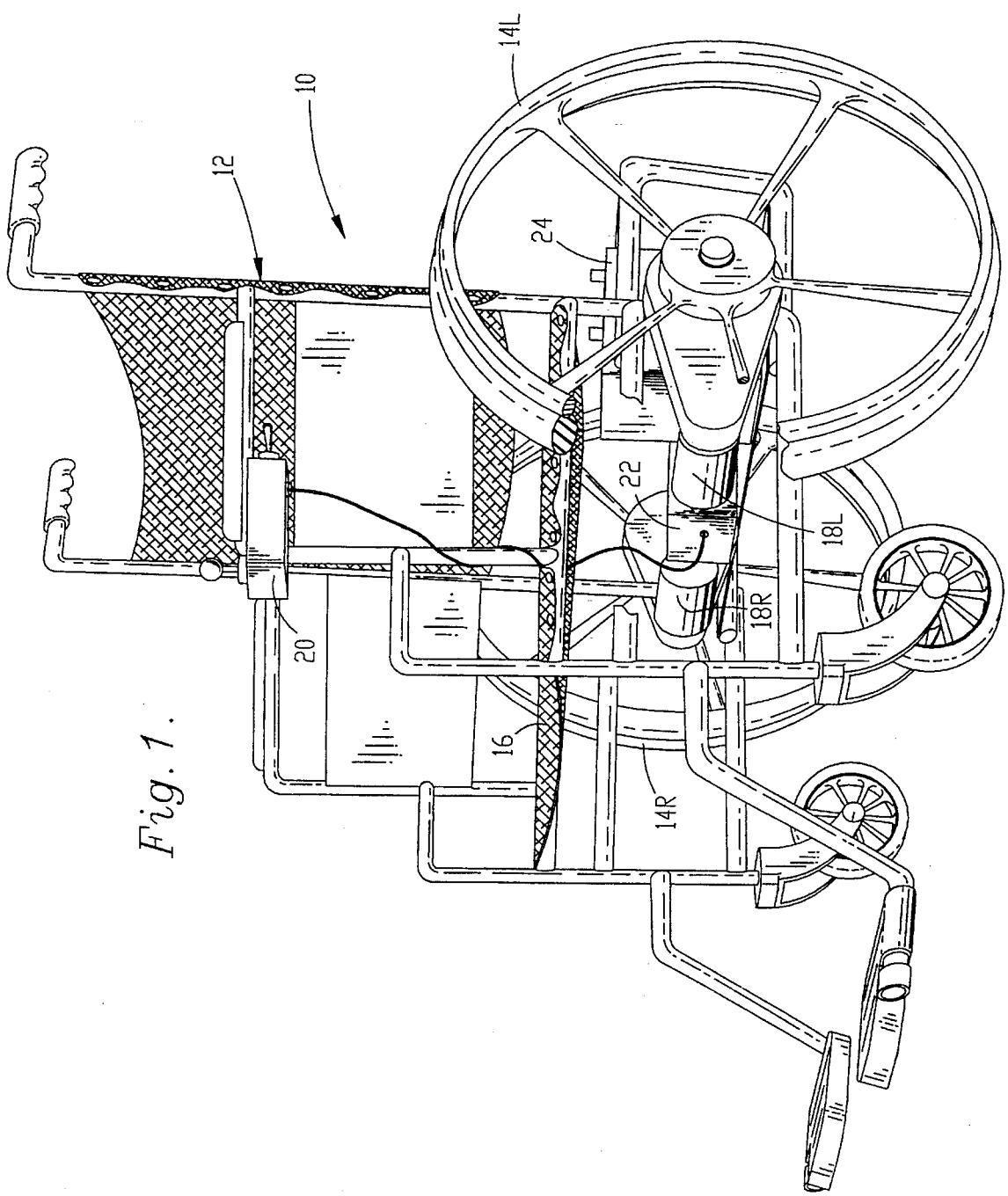
FIG. 1 is a perspective view of the preferred wheelchair illustrating the components thereof.

FIG. 1 illustrates preferred wheelchair 10 which includes framework 12 having a pair of main support wheels 14L and 14R and seat structure 16 for supporting the user, left motor 18L (ML) and right motor 18R (MR) respectively coupled with wheels 14L, R, input device 20, and controller 22 including battery 24 coupled with motors 18R,L and device 20.

Motors 18L, R are conventional bi-directional, variable speed motors responsive to pulse width modulated power signals received from controller 22.

FIG. 1 shows input device 20 as a proportional control joy stick which is illustrative of but one of a plurality of different types of input devices advantageously used in connection with the present invention. Other types of input devices include sets of one, two, three or four switches selectable on the basis of the user's hand and arm muscle control. These different types of input devices provide different types of input signals to controller 22. For example, the illustrated joy stick provides analog input signals while switches provide on-off digital signals.

Figure 2:
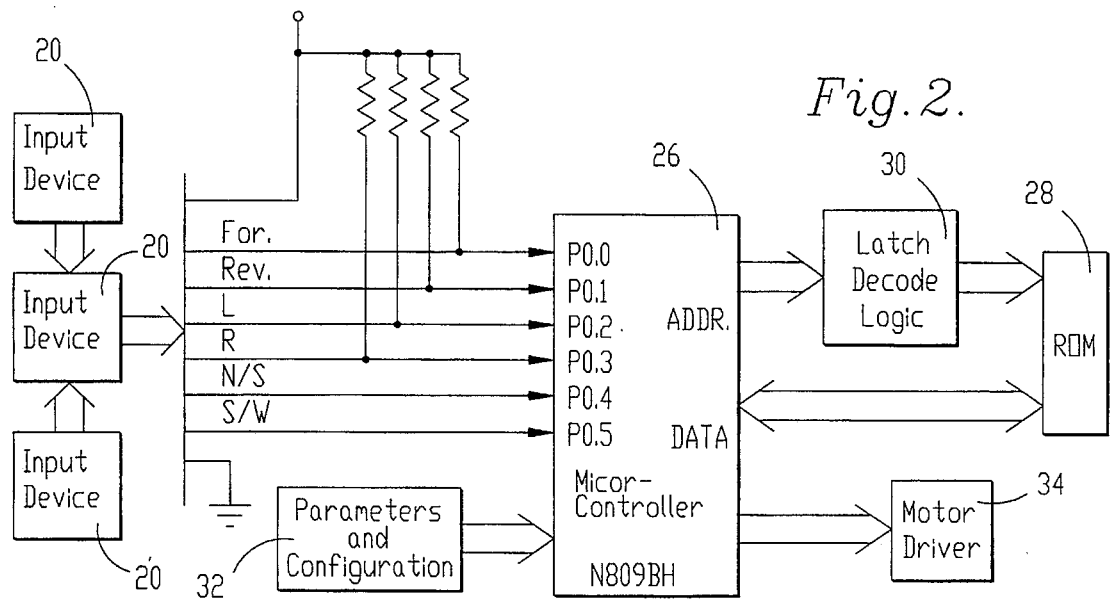
FIG. 2 is an electrical block diagram illustrating the preferred controller of FIG. 1.

FIG. 2 is a block diagram illustrating controller 22 which responds to input signals representative of desired wheelchair movements received from input device 20 by providing output signals to motors 18L, R for controlling the operation thereof and thereby the movements of wheelchair 10. Controller 22 includes microcontroller 26 (type N809BH) coupled with input device 20 as shown for receiving input signals therefrom, conventional read-only memory (ROM) 28 and latch/decode logic 30 coupled with microcontroller 26 as illustrated, parameters and configuration circuit 32, and motor driver circuit 34. ROM 28 stores the program for operating microcontroller 26 as illustrated by the flow charts of FIGS. 5–10.

Parameters and configuration circuit 32 (FIG. 3) provides information to microcontroller 26 representative of operational parameters of motors 18L, R and information representative of the type of input device connected to microcontroller 26. Circuit 32 includes device 34 (type CD4051) coupled with potentiometers 36, 38, 40, 42, 44, and 48, device 50 (type CD4051) coupled with eight-switch DIP unit 52, all interconnected as shown. Terminals A, B, and C of each of devices 34 and 50 receive inputs from terminals P2.5, P2.6 and P2.7 of microcontroller 26 as bit selection inputs 0, 1 and 2. Device 34 provides an analog output representative of the analog value of the bit-selected potentiometer 36–48 to terminal P0.6 of microcontroller 26, and device 50 provides a digital output representative of the position of the bit-selected switch of unit 52 to terminal P0.7 of microcontroller 26.

The analog values provided by potentiometers 36–48 are adjustable to define the operating parameters of motors 18L, R and correspond respectively to the parameters of time delay, and maximum speeds of reverse movement, turning, braking, acceleration and forward movement. The output value of potentiometer 36 provides a time delay between input signals representative of a desired wheelchair movement and execution of that movement.

The position of the switches of unit 52 represent the type of input device 20 connected to microcontroller 26. That is to say, the positions of these switches tells the program of FIGS. 5–10 which subroutine to call for proper response to the input signals to effect wheelchair movement.

Figure 4:
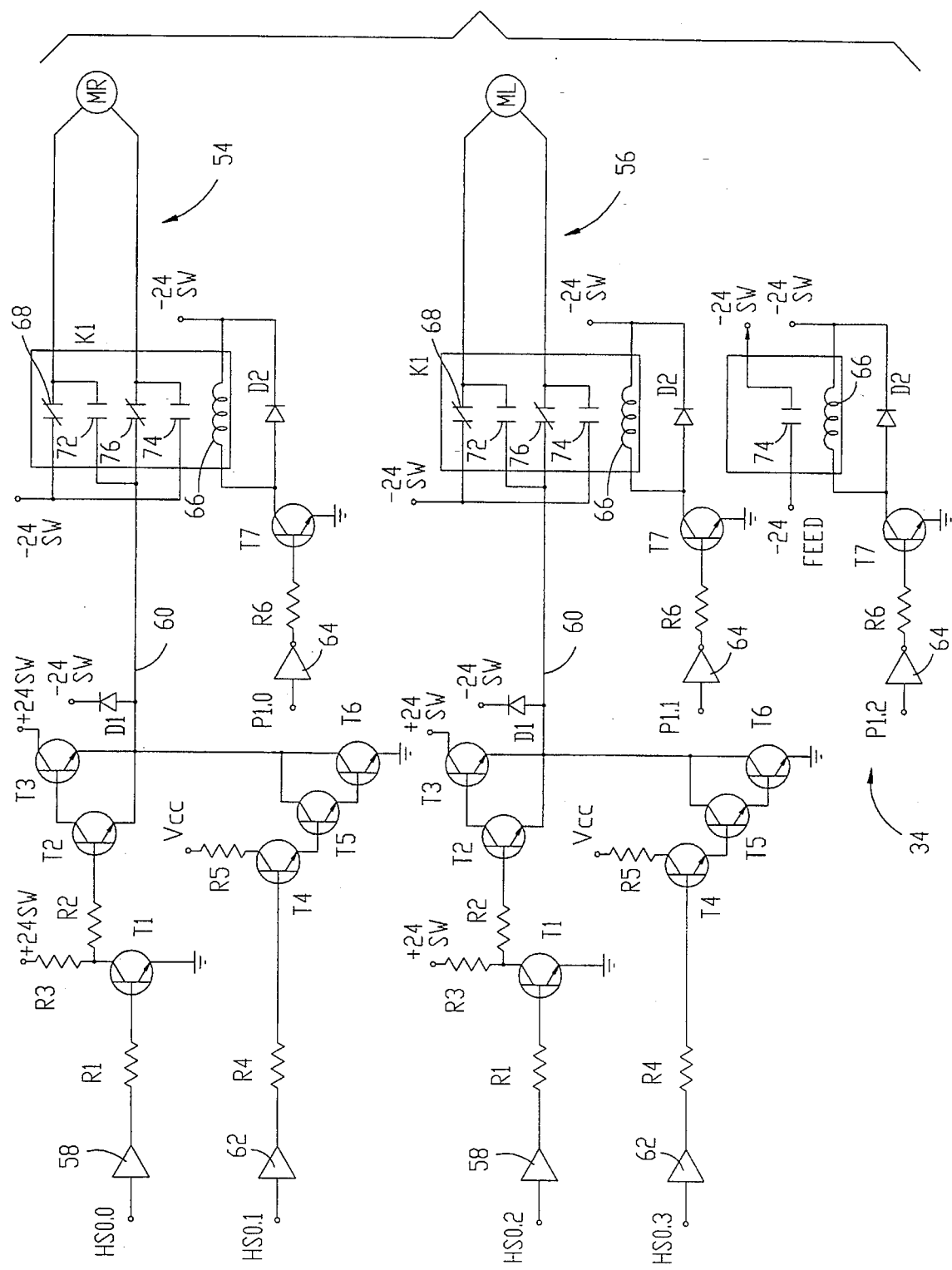
FIG. 4 is an electrical schematic illustrating the motor driver circuit of FIG. 2.

FIG. 4 illustrates motor driver circuit 34 which receives control and pulse-width-modulated (PWM) signals from microcontroller 26, amplifies the PWM signals under the power of battery 24, and applies these signals to motors 18L, R for forward, rearward and braking action. Circuit 34 includes identical left and right motor driver subcircuits 54 and 56 for controlling motors 18L, R respectively.

Subcircuit 54 receives a braking PWM signal from terminal HS0.0 of microcontroller 26 at operational amplifier 58 which are transmitted from the output thereof through resistor R1 (4.7K Ohms) to the base of transistor T1 the emitter of which is connected to ground. The amplified PWM signals from the collector of transistor T1 are provided through resistor R2 to the base of transistor T2. Pull up voltage at the T1 emitter is at 24 VDC through resistor R3 (1.2K Ohms). The emitter of T2 is connected to the base of transistor T3 the emitter of which is in turn connected to power at 24 VDC. The collectors of transistors of T2 and T3 are common and provide amplified PWM signals for braking motor 18L on line 60 to relay K1. The anode of diode D1 is connected to line 60 with the cathode connected to −24 VDC.

Microcontroller 26 provides PWM signals from terminal HS0.1 to the input of comparator 62 for driving motor 18L forward or reverse depending upon the state of relay K1. The output from comparator 62 is transmitted by way of resistor of R4 (4.7K Ohms) to the base of transistor T4 the collector of which is connected to supply voltage VZC by way of resistor R5 (50 Ohms). The output from transistor T4 is supplied from the emitter thereof to the base of transistor T5. The emitter of transistor T5 is in turn connected to the base of transistor T6 the emitter of which is connected to ground. The collectors of transistors T5 and T6 are common with line 60 and provide amplified PWM signals to relay K1.

Relay K1 controls the forward or reverse direction of motor 18L. The appropriate directional control signal is received from terminal P1.0 of microcontroller 26 at invertor 64 the inverted output from which is conveyed to the base of transistor T7 by way of resistor R6 (4.7K Ohms). The emitter of transistor T7 is connected to ground and the collector thereof is connected to one side of K1 relay coil 66 and to the anode of suppression diode D2. The other side of coil 66 and the cathode of diode D2 are connected to −24 VDC.

Relay K1 further includes normally open contacts 68 and 70 and normally contacts 72 and 74. As an inspection of FIG. 4 illustrates the de-energized position of relay K1 provides the positive voltage PWM signals to one terminal of motor 18L, and connects the other terminal to −24 VDC. When energized in response to a signal from controller terminal P1.0, relay K1 delivers the positive PWM signals to the other terminal of motor 18L for operation in reverse direction. As those skilled in the art appreciate, the duty cycle of the PWM signals received from controller 26 determines the speed of operation of motor 18L.

The operation of subcircuit 56 is the same as that of subcircuit 54 except that the output therefrom is connected to right motor 18R and the signals received from microcontroller 26 are received from terminals HS0.2, HS0.3 and P1.1 as illustrated in FIG. 4.

Figure 5:
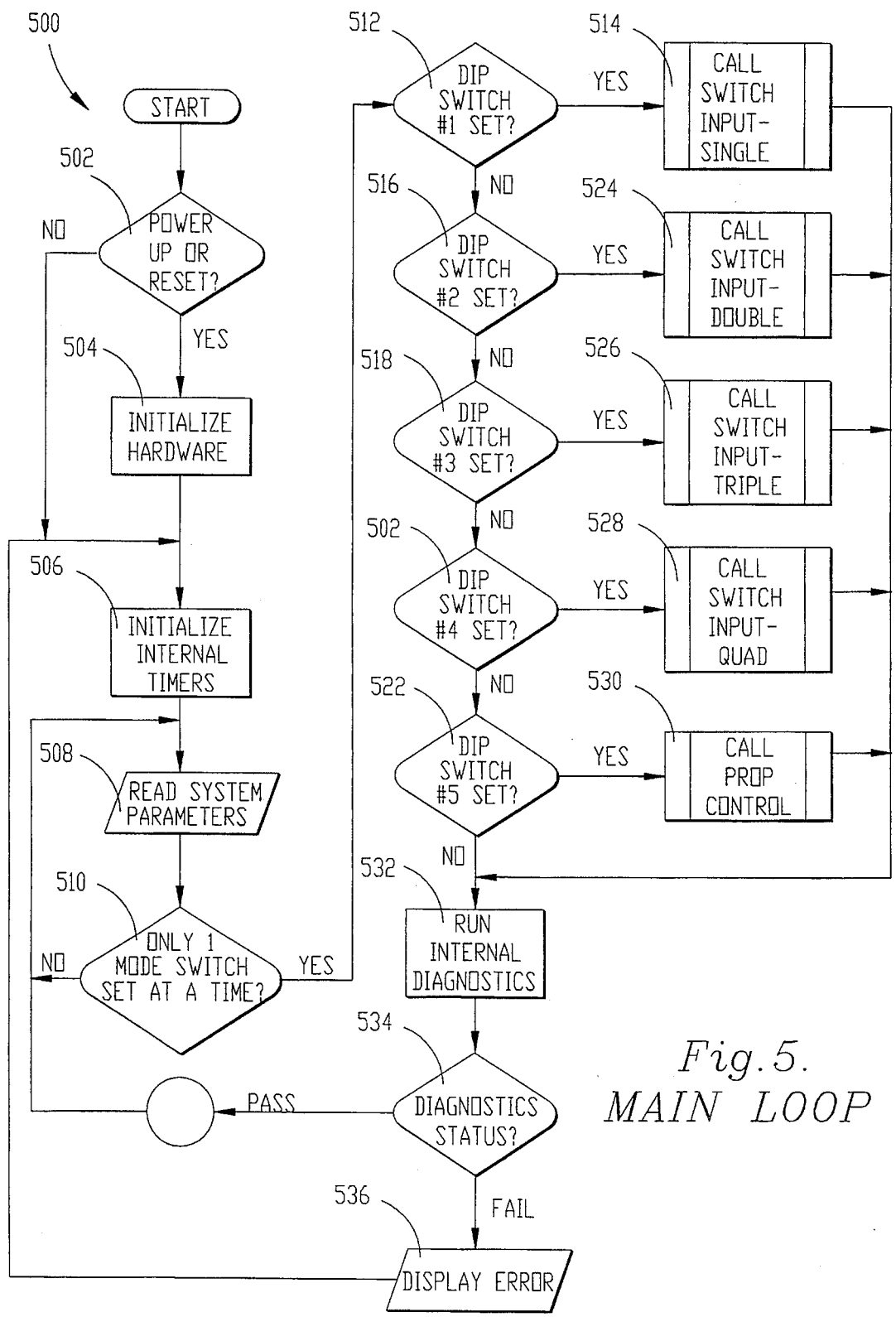
FIG. 5 is a computer program flow chart of the MAIN LOOP for operating the microcontroller of FIG. 2.

FIGS. 5–10 are computer program flow charts illustrating the operation of microcontroller 26 and thereby controller 22 for controlling the operation of motors 18L, R in response to the input signals from input device 20. More particularly, FIG. 5 illustrates MAIN LOOP 500 which enters at step 502. This step asks whether the operation is at power up or reset. If yes, program moves to step 504 which initializes hardware by placing the various outputs in their default or quiescent state.

Figure 3:
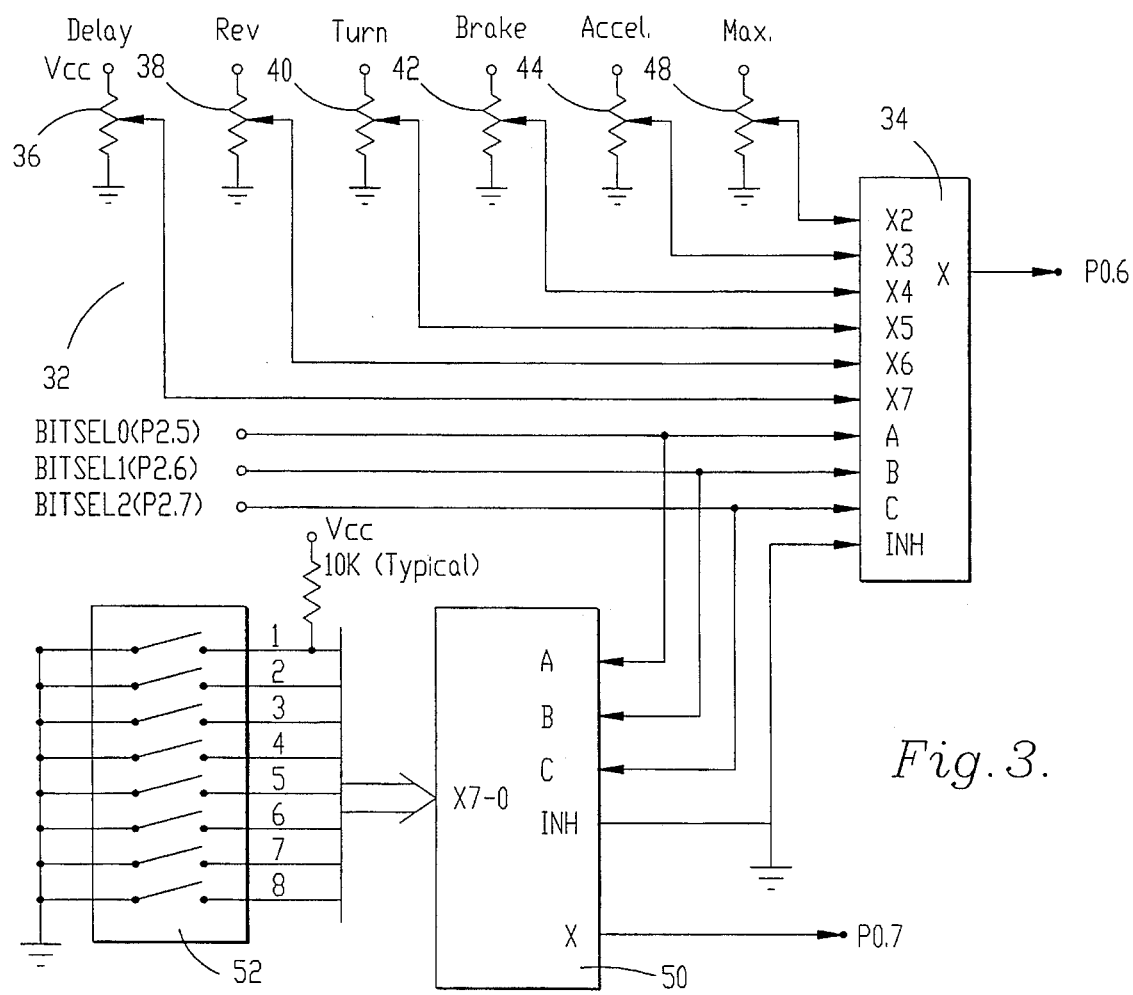
FIG. 3 is an electrical schematic illustrating the parameters circuit of FIG. 2.

If the answer in step 502 is no, or after step 504, step 506 initializes the internal software timers. Step 508 then reads the system parameters represented by the analog signals from potentiometers 36–48 (FIG. 3). That is to say, the eight possible combinations of bit select outputs from terminals P2.−7 cause device 34 to transmit each of the potentiometers outputs to terminal P0.6 of microcontroller 26. Similarly, the bit select outputs also prompt device 50 to transmit each of the on-off status of the switches of unit 52 to terminal P0.7 of microcontroller 26.

Step 510 then asks whether only one mode switch is set at a time. If the answer in step 510 is no, program moves back to step 508 to read again the system parameters.

If the answer in step 510 is yes, the next series of steps read the DIP switches 1–8 of device 52 (FIG. 3). The position of these switches indicates to microcontroller 26 the type of input signals to which controller 22 should respond. In the preferred embodiment, five different types of input devices are contemplated including single, double, triple, quadruple sets of switches plus a proportional control joy stick. DIP switches numbers 1–5 are set corresponding to which of these input devices are connected to microcontroller 26. This capability exemplifies a distinct advantage of the present invention over the prior art because the same controller 22 can be used with any of these input devices. This allows substantial savings and cost because longer manufacturing runs are possible and only one type of controller need be carried in inventory. Additionally, if a wheelchair user needs a different type of input device, then only the input device need be changed and the same controller can be used, only requiring a change in DIP switch setting.

Step 512 asks whether DIP switch #1 is set. If yes, step 514 calls the subroutine "switch input—single". Similarly, steps 516, 518, 520 and 522 ask whether DIP switch numbers 2–5 are set and if yes, call subroutines "switch input—double, triple, quad" and "proportional control" respectively in steps 524, 526, 528 and 530.

The preferred embodiment also encompasses the optional inclusion of a sixth DIP switch and an LCD or LED display (not shown) for a scanner/display function. Activation of this additional DIP switch calls the single switch subroutine and also causes the display to illustrate, in continuous sequence, the possible actions—forward, reverse, left and right plus braking. Activation of the single operating switch during display of one of these actions selects the action being displayed, and calls the subroutine for initiating this selected direction. With this provision, the user need only activate the switch once for each desired action.

If the answer in all of steps 512 and 516–522 are no, or after executing the subroutines called steps 514 and 524–530, step 532 runs conventional internal diagnostics and step 534 then asks whether the diagnostics test is pass or fail. If pass, program loops back to step 508. If the diagnostics test fails, step 536 displays the error on a conventional liquid crystal display (not shown). As can be appreciated, the internal diagnostics of step 532 are executed with each pass through MAIN LOOP 500.

Figure 6:
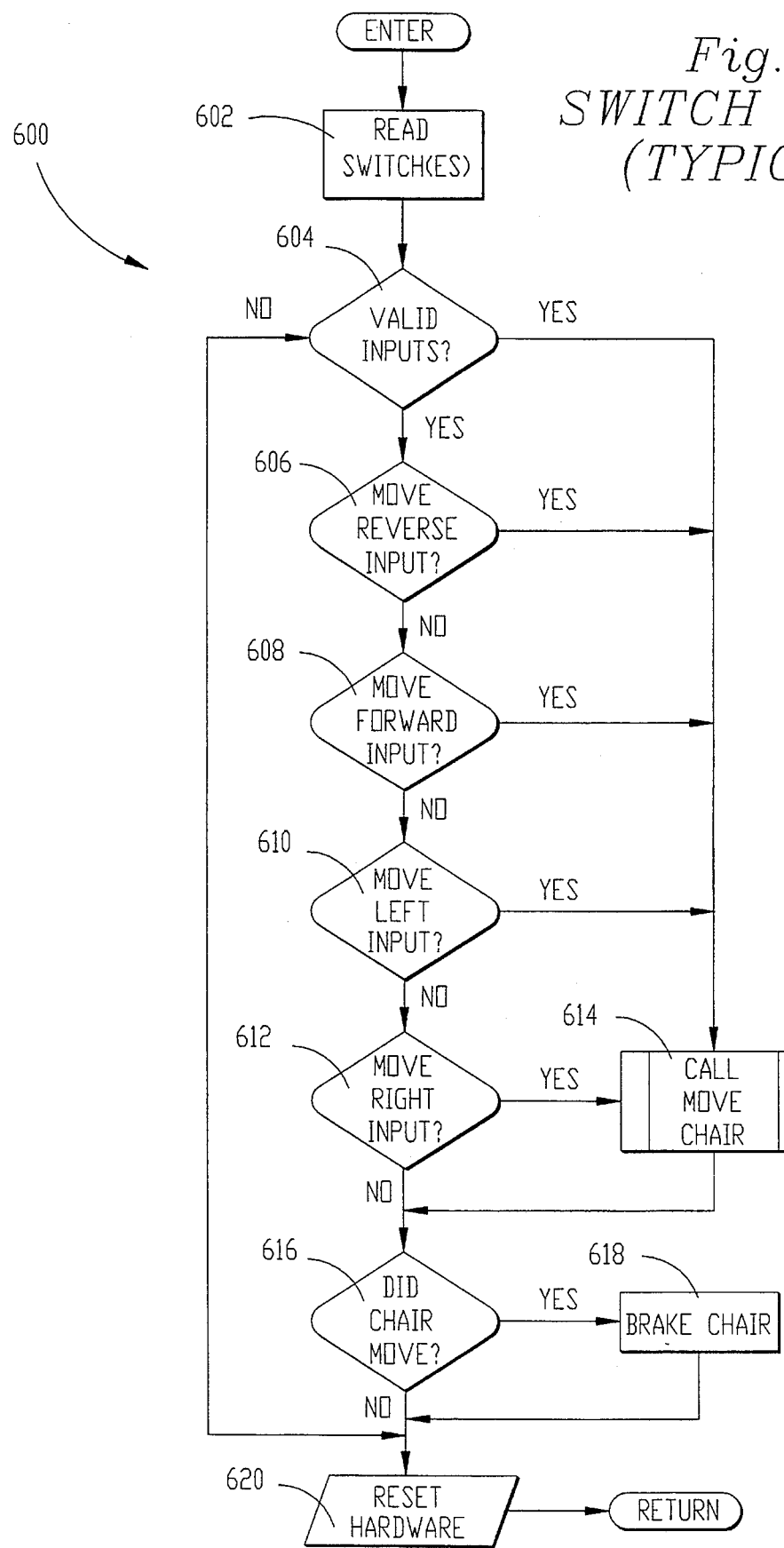
FIG. 6 is a computer program flow chart of the SWITCH INPUT module of FIG. 5.

FIG. 6 illustrates SWITCH INPUT 600 which is typical of the subroutines called in steps 514 and 524–530 (FIG. 5). More particularly, for a one-switch input device, one, two, three and four activations within the delay window set on potentiometer 36 (FIG. 3) respond respectively to forward, left, right, and reverse. For a two-switch input device, one and two activations within the delay window of the left switches correspond to left and forward and one and two activations of the right switch correspond respectively to right and reverse. With a three-switch device, activation of the three correspond to forward, left and right desired movements. Two activations within the delay window of the forward switch indicates reverse. Finally, the four switches of a four-switch device correspond to forward, left, right and reverse. Subroutine 600 responds to these various input signals.

Subroutine SWITCH INPUT 600 enters at step 602 which reads the switch activation inputs described above as appropriate for the input device designated on the DIP switches on unit 52. Step 604 then asks whether the inputs are valid.

Figure 8:
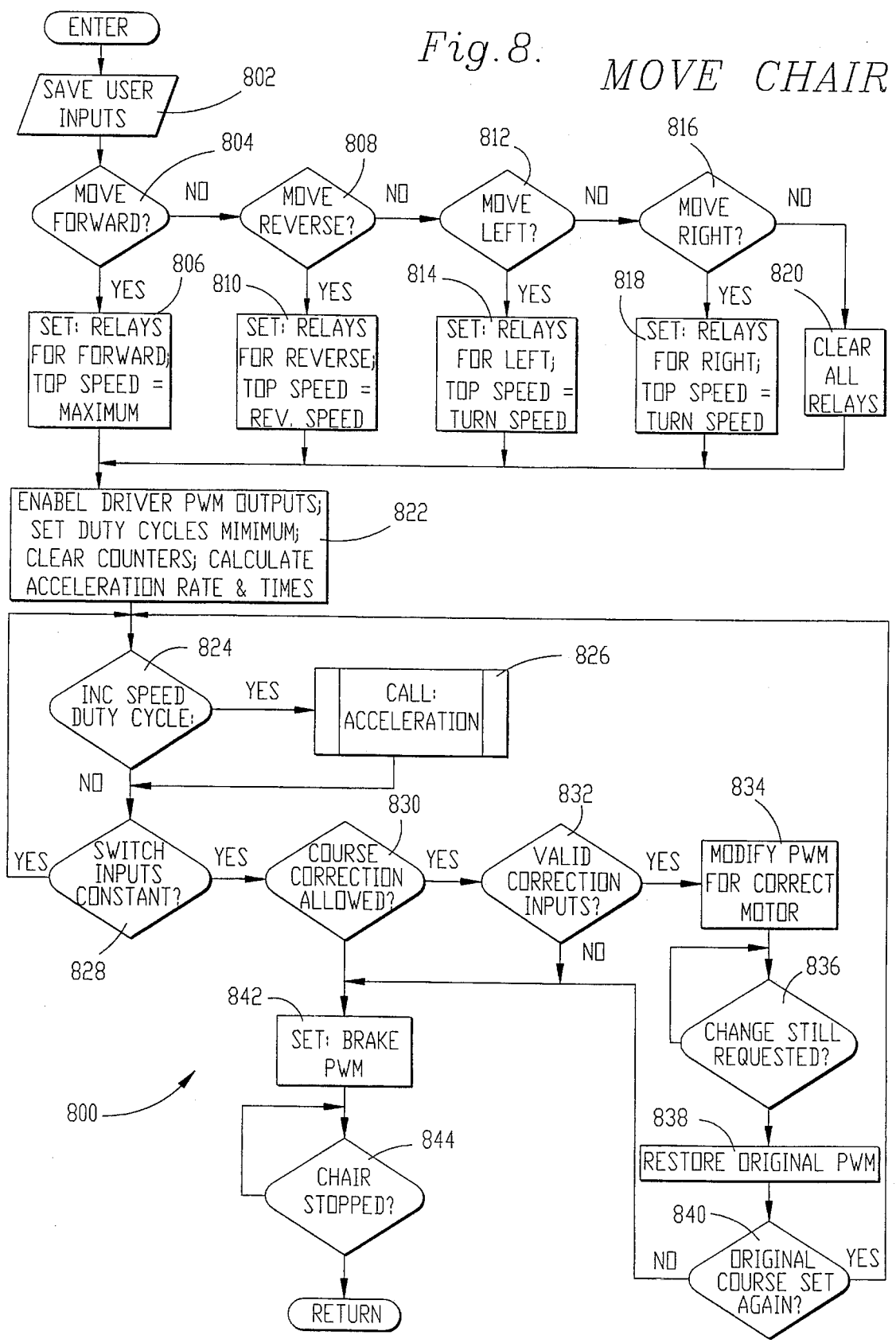
FIG. 8 is a computer program flow chart of the MOVE CHAIR module of FIG. 6.

If the answer in step 604 is yes, step 606 then asks whether the input corresponds to forward movement of the wheelchair. If no, step 608 asks whether the input corresponds to reverse. If no, step 610 asks if the input corresponds to move left and finally, step 612 asks whether the input corresponds to move right. If the answer is yes in any of steps 606–612, step 614 calls MOVE CHAIR subroutine 800 (FIG. 8).

If the answer in step 612 is no, or after step 614, step 616 asks whether the chair moved. If yes, step 618 activates the outputs from microcontroller 26 to motor driver circuit 34 to brake chair movement.

If the answers in steps 604 or step 616 are no, or after step 618, step 620 resets the outputs from microcontroller 26 to the default states. A no answer in step 604 occurs, for example, when more than the allowable switch activations occur during a delay interval. A no answer to all of steps 604–612 would occur when the user is not indicating any desired wheelchair movements. After step 620, program returns to step 532 (FIG. 5).

Figure 7:
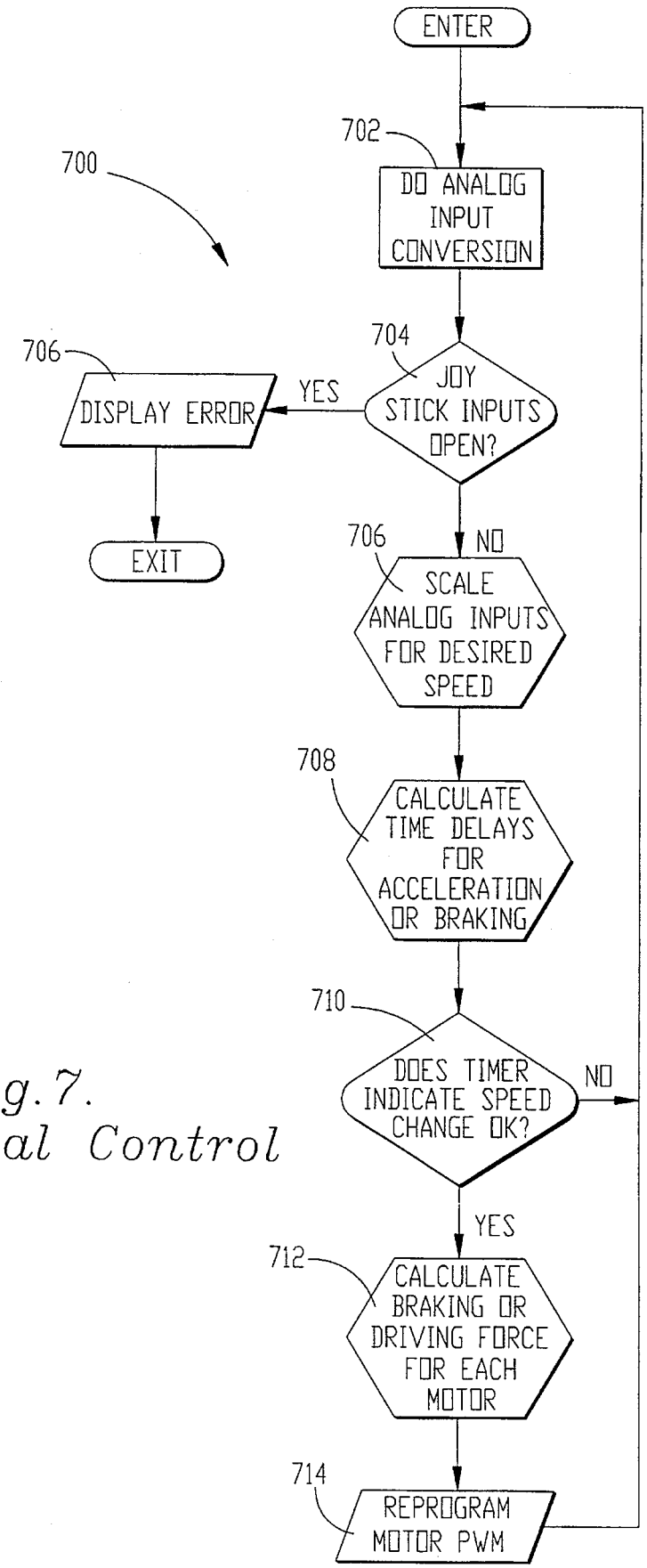
FIG. 7 is a computer program flow chart of the PROPORTIONAL CONTROL module of FIG. 5.

FIG. 7 illustrates proportional control subroutine 700 called in step 530 (FIG. 5). Subroutine 700 enters that step 702 which prompts microcontroller 26 to perform an analog to digital conversion of the inputs received at terminals P0.0–5 in order to read the analog inputs from the joy stick used as input device 20. Step 704 asks whether the joy stick inputs are open. If yes, step 706 prompts the error to be displayed and the program then exits to await correction of the problem.

If the answer in step 704 is no, step 706 scales the analog inputs for the desired speed and step 708 then calculates the time delays for acceleration or braking.

Step 710 then asks whether the timer indicates that the speed change is within acceptable limits. If no, the program loops back to re-execute steps 702–710. If the answer in step 710 is yes, step 712 calculates the needed braking or driving force for each motor and, based upon this calculation, step 714 reprograms or reconfigures the pulse width for the PWM signals delivered to motor drive 34. The program then loops back to step 702.

FIG. 8 illustrates MOVE CHAIR subroutine 800 called in step 614 (FIG. 6). This subroutine enters at step 802 which saves the user inputs, that is, the switch activations.

Step 804 then asks whether the chair is to move forward. If yes, step 806 activates the outputs to motor driver circuit 34 to operate both motors in the forward direction at top speed as indicated by the parameter setting on potentiometer 48.

If the answer in step 804 is no, step 808 then asks whether the input signal is for reverse movement. If yes, step 810 activates motor driver circuit 34 for reverse operation of motors 18L, R at top reverse speed as indicated by the setting on potentiometer 38.

If the answer in step 808 is no, step 812 asks whether the user has prompted for leftward movement. If yes, step 814 activates motor circuit 34 for a left turn at the maximum speed indicated on potentiometer 40. Similarly, step 816 asks whether the user has indicated a right turn, and if yes, step 818 activates circuit 34 to execute this movement.

If the answer in all of steps 804, 808, 812 and 816 are no, input signals have been misread and step 820 de-energizes the relays in motor driver circuit 34 to their default settings. After steps 806, 810, 814, 818 and 820, the program moves to step 822 which enables the PWM signal outputs from terminals HS0.1 and .3. This step also sets the PWM duty cycle at minimum, clears the internal software counters, and then calculates the acceleration rate and times.

Figure 9:
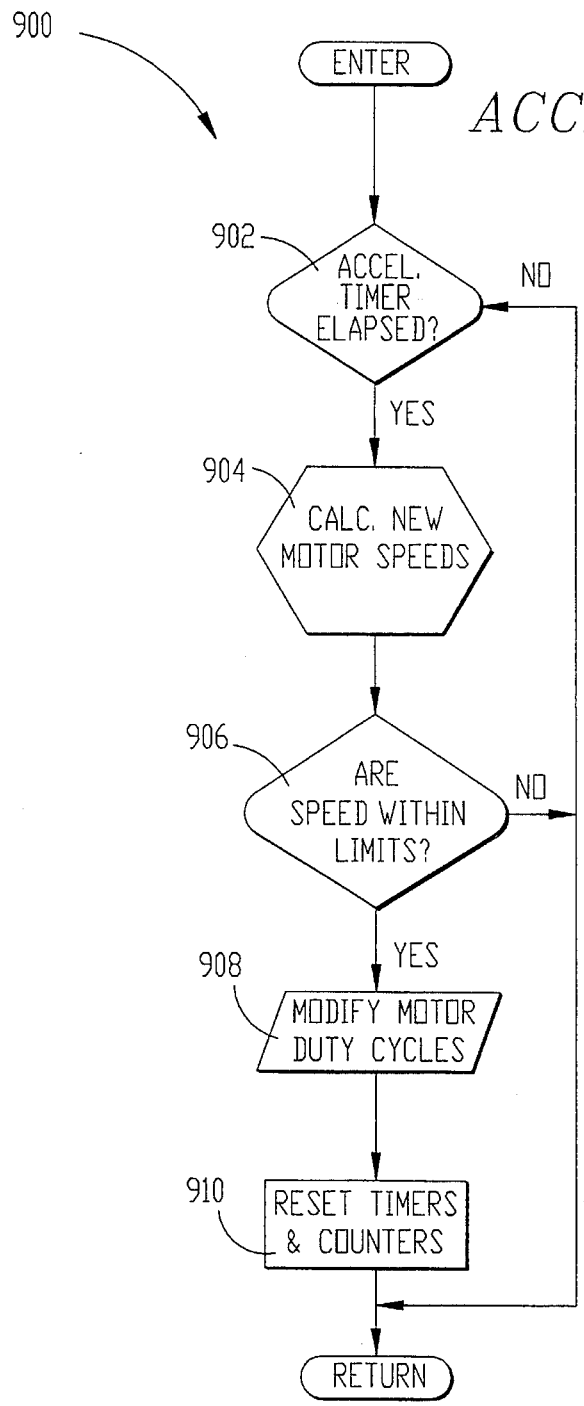
FIG. 9 is a computer program flow chart of the ACCELERATION module of FIG. 8.

Step 824 then asks whether an increase in the duty cycle has been indicated for an increase in motor speed. If yes, step 826 calls ACCELERATION subroutine 900 (FIG.9). If the answer in step 824 is no, or after step 826, step 828 asks whether the switch inputs are constant from input device 20. If yes, indicating that the user desires to increase speed, the program moves back to step 824.

If the answer in step 828 is no, step 830 asks whether a course correction is allowed during wheelchair movement. If yes, step 832 asks whether the course correction inputs are valid and if yes, step 834 modifies the PWM signals to circuit 34 to the appropriate motor to modify the course of wheelchair 10. After completion of step 834, step 836 asks whether a course correction change is still requested. If yes, program continues to loop through this step until such an input is no longer indicated. This causes the course correction movements to continue until such an input is no longer requested. When the user is on the desired course, and a course correction is no longer indicated the answer in step 836 is no and the original PWM signals are restored in step 838 to put wheelchair 10 back on the straight course.

Step 840 then asks whether the original course has been reset. If yes, program loops back to step 824. If the original course is not indicated, the answer in step 840 is no and the program moves to step 842. This step is also entered upon a no answer in steps 830 and 832. Step 842 alters the PWM signals for braking action and activates terminals P1.0–1 for braking action on both of motors 18L, R.

Step 844 then asks whether movement of wheelchair 10 has stopped in response to the braking action. The program continues to loop through step 844 unit such movement has stopped after which the program returns to step 616 (FIG.6).

ACCELERATION subroutine 900 is illustrated in FIG. 9. This subroutine is called in step 826 (FIG. 8).

Subroutine 900 enters at step 902 which asks whether acceleration timer has elapsed If yes, step 904 calculates new motor speeds and step 906 then asks whether these new speeds are within predefined acceptable limits. If yes, step 908 modifies the duty cycle of the PWM signals to increase the motor speeds.

Figure 10:
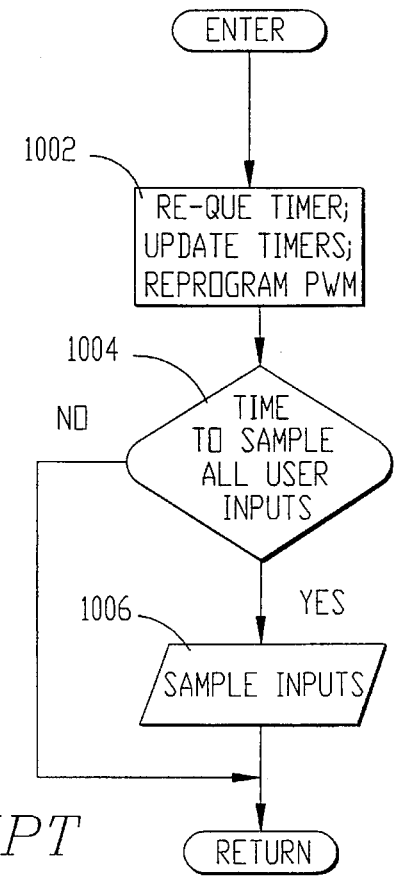
FIG. 10 is a computer program flow chart of the TIMER INTERRUPT module.

Step 910 then resets acceleration timers and counters. If the answers in steps 902 or 906 are no, or after step 910, the program returns to step 828 (FIG. 8). FIG. 10 illustrates TIMER INTERRUPT subroutine 1000 which interrupts MAIN LOOP 500 on a timer basis. Subroutine 1000 enters at step 1002 which re-quest the interrupt timer, updates other timers and reprograms the pulse widths modulation signals. Step 1004 then asks whether it is time to sample the user inputs from input device 20. If yes, step 1006 samples the input signals. If the answer in step 1004 is no, or after step 1006 the interrupt ends and the program returns to the interrupted step.

As those skilled in the art will appreciate, the present invention encompasses many variations in the preferred embodiment herein. For example, controller 22 can be easily modified to incorporate responsiveness to many types of input devices in addition to those described herein. Additionally, the functions performed as a result of the preferred computer program could also be performed totally with hardware using a custom designed semiconductor chip, for example.

Having thus described the preferred embodiment of the present invention, the following is claimed as new and desired to be secured by Letters Patent:

We claim:

1. An electrically operable wheelchair comprising:

a wheelchair framework having wheels and structure for supporting a user;

an electrically operable motor coupled with one of said wheels;

control means coupled with said motor for controlling the operation thereof and thereby the movements of said wheelchair in accordance with input signals received from a source thereof; and an input device selected from a plurality of different types of user-operable input devices including means for coupling with said control means and operable for providing said input signals thereto, said different types of input devices being operable for providing a plurality of different types of input signals characteristic of the corresponding input device and representative of desired wheelchair movements, said control means including means for responding to said plurality of different types of input signals for controlling said wheelchair movements; and selector means for producing a selection signal representative of a selected one of said different types of input devices, said control means including means for storing a plurality of computer program subroutines corresponding to said different types of user-operable devices, said control means being operable for executing said subroutines for controlling the movements of said wheelchair in accordance with input signals from the corresponding input device, said control means further including means for receiving said selection signal and for responding thereto by retrieving for execution one of said subroutines corresponding to the type of input device represented by said selection signal.

2. The wheelchair as set forth in claim 1, said wheels including a pair of main support wheels, said wheelchair further including a pair of said motors respectively coupled with said support wheels, said control means being coupled with both of said motors and including means for independently controlling the operation of said motors for effecting said wheelchair movements.

3. The wheelchair as set forth in claim 2, said control means including means for providing pulse width modulated signals to said motors for controlling the operation thereof.

4. The wheelchair as set forth in claim 1, said wheelchair movements including forward, reverse, left, right and braking.

5. The wheelchair as set forth in claim 1, said control means including a portable power source.

6. The wheelchair as set forth in claim 5, said power source including a battery.

7. The wheelchair as set forth in claim 1, said input device including a device having at least one switch for providing on-off signals as said input signals.

8. The wheelchair as set forth in claim 1, said input device including a proportional control device operable for providing analog signals as said input signals.

9. The wheelchair as set forth in claim 1, said control means further including selectable parameter means for indicating parameters of said wheelchair movements.

10. The wheelchair as set forth in claim 9, said movements including forward, reverse, left, right and braking, said parameter means including means for indicating the maximum rate of said movements.

11. The wheelchair as set forth in claim 9, said control means including means for providing a delay between receipt of an input signal representative of a desired wheelchair movement and execution of said movement, said parameter means including means for indicating the time duration of said delay.

12. An electrically operable wheelchair as recited in claim 1, said selector means comprising a multi-switch dip switch, said dip switch being externally mounted on said control means, wherein said dip switch is externally accessible to allow manual switching by the operator.

13. An electrically operable wheelchair as recited in claim 12, said means for responding comprising a plurality of subroutines loaded in said control means for processing said plurality of input signals, wherein said selector switch determines which subroutine is selected to process said input signals.

14. The wheelchair as set forth in claim 1, said controller including a microprocessor.

15. A controller for a wheelchair having structure for supporting a user, wheels, and at least one electrically operable motor coupled with one of the wheels for effecting wheelchair movements, said controller comprising:

signal processing means for receiving and processing input signals representative of desired wheelchair movements and for producing corresponding output signals for controlling operation of the wheelchair motor and thereby the wheelchair movements:

output means for intercoupling said signal processing means and wheelchair motor for delivering said output signals thereto;

input means for coupling with an input device selected from a plurality of different types of user-operable input devices, said different types of input devices being operable for producing a respective plurality of different types of input signals characteristic of the corresponding type of device and with each type of signals being representative of desired wheelchair; and selector means for producing a selection signal representative of a selected one of said different types of input devices, said signal processing means including means for storing a plurality of computer program subroutines corresponding to said different types of user-operable devices, said control means being operable for executing said subroutines for controlling wheelchair movements in accordance with input signals from the corresponding input device, said control means further including means for receiving said selection signal and for responding thereto by retrieving for execution one of said subroutines corresponding to the type of input device represented by said selection signal.

16. The controller as set forth in claim 15, the wheels including a pair of main support wheels, the wheelchair further including a pair of the motors respectively coupled with said support wheels, said output means including means for coupling with both of the motors, said signal processing means including means for independently controlling the operation thereof for effecting the wheelchair movements.

17. The controller as set forth in claim 16, said signal processing means including means for providing pulse width modulated signals to the motors for controlling the operation thereof.

18. The controller as set forth in claim 15, said input device including a device having at least one switch for providing on-off signals as said input signals.

19. The controller as set forth in claim 15, said input device including a proportional control device operable for providing analog signals as said input signals.

20. The controller as set forth in claim 15, said controller further including selectable parameter means for indicating parameters of the wheelchair movements.

21. The controller as set forth in claim 20, the wheelchair movements including forward, reverse, left, right and braking, said parameter means including means for indicating the maximum rate of said movements.

22. The controller as set forth in claim 20, said controller including means for providing a delay between receipt of an input signal representative of a desired wheelchair movement and execution of said movement, said parameter means including means for indicating the time duration of said delay.

23. The wheelchair as set forth in claim 15, said signal processing means including a microprocessor.

24. An electrically operable wheelchair comprising:

a wheelchair framework having wheels and structure for supporting a user;

an electrically operable motor coupled with one of said wheels;

control means coupled with said motor for controlling the operation thereof and thereby the movements of said wheelchair in accordance with input signals received from a source thereof; and an input device selected from a plurality of different types of user-operable input devices including means for coupling with said control means and operable for providing said input signals thereto, said different types of input devices being operable for providing a plurality of different types of input signals characteristic of corresponding input device and representative of desired wheelchair movements, said control means including means for responding to said plurality of different types of input signals for controlling said wheelchair movements; and selector means for producing a selection signal representative of a selected one of said different types of input devices, said control means including means for receiving said selection signal and responding thereto by responding only to input signals characteristic of the type of input device represented by said selection signal, said different types of input devices including a plurality selected from the group consisting of a proportional control joystick, a single switch, a double switch, a triple switch, and a quadruple switch.

25. The wheelchair as set forth in claim 24, said wheels including a pair of main support wheels, said wheelchair further including a pair of said motors respectively coupled with said support wheels, said control means being coupled with both of said motors and including means for independently controlling the operation of said motors for effecting said wheelchair movements.

26. The wheelchair as set forth in claim 25, said control means including means for providing pulse width modulated signals to said motors for controlling the operation thereof.

27. The wheelchair as set forth in claim 24, said wheelchair movements including forward, reverse, left, right and braking.

28. The wheelchair as set forth in claim 24, said control means including a battery.

29. The wheelchair as set forth in claim 24, said control means further including selectable parameter means for indicating parameters of said wheelchair movements.

30. The wheelchair as set forth in claim 29, said movements including forward, reverse, left, right and braking, said parameter means including means for indicating the maximum rate of said movements.

31. The wheelchair as set forth in claim 29, said control means including means for providing a delay between receipt of an input signal representative of a desired wheelchair movement and execution of said movement, said parameter means including means for indicating the time duration of said delay.

32. The wheelchair as set forth in claim 24, said controller including a microprocessor.

33. A controller for a wheelchair having structure for supporting a user, wheels, and at least one electrically operable motor coupled with one of the wheels for effecting wheelchair movements, said controller comprising:

signal processing means for receiving and processing input signals representative of desired wheelchair movements and for producing corresponding output signals for controlling operation of the wheelchair motor and thereby the wheelchair movements;

output means for intercoupling said signal processing means and wheelchair motor for delivering said output signals thereto;

input means for coupling with an input device selected from a plurality of different types of user-operable input devices, said different types of input devices being operable for producing a respective plurality of different types of input signals characteristic of the corresponding type of device and with each type of signals being representative of desired wheelchair movements; and selector means for producing a selection signal representative of a selected one of said different type of input devices, said signal processing means including means for receiving said selection signal and responding thereto by responding only to input signals characteristic of the type of input device represented by said selection signal, said different types of input devices including a plurality selected from the group consisting of a proportional control joystick, a single switch, a double switch, a triple switch, and a quadruple switch.

34. The controller as set forth in claim 33, the wheels including a pair of main support wheels, the wheelchair further including a pair of the motors respectively coupled with the support wheels, said signal processing means including means for coupling with both of the motors and including means for independently controlling the operation of the motors for effecting the wheelchair movements.

35. The controller as set forth in claim 34, said signal processing means including means for providing pulse width modulated signals to the motors for controlling the operation thereof.

36. The controller as set forth in claim 33, the wheelchair movements including forward, reverse, left, right and braking.

37. The controller as set forth in claim 33, said signal processing means further including selectable parameter means for indicating parameters of the wheelchair movements.

38. The controller as set forth in claim 37, the movements including forward, reverse, left, right and braking, said parameter means including means for indicating the maximum rate of the movements.

39. The controller as set forth in claim 38, said signal processing means including means for providing a delay between receipt of an input signal representative of a desired wheelchair movement and execution of said movement, said parameter means including means for indicating the time duration of said delay.

40. The controller as set forth in claim 33, said signal processing means including a microprocessor.

* * * * *